US007817825B2

(12) United States Patent
Genda

(10) Patent No.: US 7,817,825 B2
(45) Date of Patent: Oct. 19, 2010

(54) APPARATUS, SYSTEM AND METHOD FOR PERSON VERIFICATION

(75) Inventor: Daisuke Genda, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 960 days.

(21) Appl. No.: 11/234,729

(22) Filed: Sep. 23, 2005

(65) Prior Publication Data

US 2006/0165262 A1 Jul. 27, 2006

(30) Foreign Application Priority Data

Jan. 24, 2005 (JP) ............................. 2005-015625

(51) Int. Cl.
 G06K 9/00 (2006.01)
 G06K 9/54 (2006.01)
 G06K 19/00 (2006.01)
(52) U.S. Cl. .................... 382/115; 382/116; 382/124; 382/305; 340/5.52; 713/182; 713/186; 726/21
(58) Field of Classification Search ......... 382/115–127; 713/182, 186; 726/21
See application file for complete search history.

(56) References Cited

U.S. PATENT DOCUMENTS

| | | | | | |
|---|---|---|---|---|---|
| 5,465,303 | A | * | 11/1995 | Levison et al. ............... | 382/124 |
| 5,613,012 | A | * | 3/1997 | Hoffman et al. ............. | 382/115 |
| 5,802,199 | A | * | 9/1998 | Pare et al. .................... | 382/115 |
| 5,805,719 | A | * | 9/1998 | Pare et al. .................... | 382/115 |
| 5,953,443 | A | | 9/1999 | Hiratsuka et al. | |
| 5,978,495 | A | * | 11/1999 | Thomopoulos et al. ..... | 382/124 |
| 6,031,942 | A | | 2/2000 | Nakayama | |
| 6,061,506 | A | * | 5/2000 | Wollaston et al. ............. | 703/23 |
| 6,111,977 | A | * | 8/2000 | Scott et al. ................... | 382/124 |
| 6,247,813 | B1 | | 6/2001 | Kim et al. | |

(Continued)

FOREIGN PATENT DOCUMENTS

JP 2001-084371 A 3/2001

(Continued)

OTHER PUBLICATIONS

Hiroyuki, Tsuji, "Method and Device for Identifying Person", Oct. 4, 2002, Machine Translation of Japanese Unexamined Laid-Open Patent Publication No. 2002-108487), p. 1-15.*

(Continued)

*Primary Examiner*—Wenpeng Chen
*Assistant Examiner*—Gandhi Thirugnanam
(74) *Attorney, Agent, or Firm*—Holtz, Holtz, Goodman & Chick, PC

(57) ABSTRACT

A person verification apparatus having: a biological information input section to receive an input of biological information of a person and to obtain a data of the biological information as a data to be verified; an ID input section to receive an input of ID of a person; and a control section to compare the data to be verified with plural pieces of referential data registered in advance, and to obtain referential data corresponding to the ID received by the ID input section and compare whether the referential data corresponding to the ID matches with the data to be verified when the data to be verified does not match with the plural referential data.

14 Claims, 13 Drawing Sheets

U.S. PATENT DOCUMENTS

| | | | |
|---|---|---|---|
| 6,363,488 B1 * | 3/2002 | Ginter et al. .................... | 726/1 |
| 6,411,784 B1 * | 6/2002 | Taniguchi ...................... | 399/6 |
| 6,421,453 B1 | 7/2002 | Kanevsky et al. | |
| 6,496,595 B1 | 12/2002 | Puchek et al. | |
| 6,510,236 B1 | 1/2003 | Crane et al. | |
| 7,020,308 B1 | 3/2006 | Shinzaki et al. | |
| 7,151,846 B1 * | 12/2006 | Fujii .......................... | 382/125 |
| 7,359,533 B2 * | 4/2008 | Moon et al. .................. | 382/124 |
| 2001/0017584 A1 | 8/2001 | Shinzaki | |
| 2001/0026632 A1 * | 10/2001 | Tamai ......................... | 382/116 |
| 2002/0018585 A1 * | 2/2002 | Kim ........................... | 382/125 |
| 2002/0073213 A1 * | 6/2002 | Mekata et al. ............... | 709/229 |
| 2002/0073344 A1 | 6/2002 | Maritzen et al. | |
| 2002/0191817 A1 * | 12/2002 | Sato et al. .................... | 382/118 |
| 2003/0005310 A1 * | 1/2003 | Shinzaki ...................... | 713/186 |
| 2003/0028811 A1 | 2/2003 | Walker et al. | |
| 2003/0095691 A1 * | 5/2003 | Nobuhara et al. ........... | 382/124 |
| 2003/0099379 A1 | 5/2003 | Monk et al. | |
| 2003/0118216 A1 * | 6/2003 | Goldberg .................... | 382/115 |
| 2003/0150915 A1 * | 8/2003 | Reece ......................... | 235/449 |
| 2003/0174867 A1 * | 9/2003 | Harney et al. ............... | 382/116 |
| 2003/0212709 A1 | 11/2003 | De Schrijver | |
| 2004/0008872 A1 * | 1/2004 | Goldberg .................... | 382/115 |
| 2004/0123114 A1 * | 6/2004 | McGowan .................. | 713/186 |
| 2004/0146186 A1 | 7/2004 | Gelbord | |
| 2004/0156535 A1 * | 8/2004 | Goldberg et al. ............ | 382/115 |
| 2005/0007619 A1 * | 1/2005 | Minato ....................... | 358/1.14 |
| 2005/0063567 A1 | 3/2005 | Saitoh et al. | |
| 2005/0091325 A1 * | 4/2005 | Kuwana et al. ............. | 709/206 |
| 2005/0178821 A1 * | 8/2005 | Ono et al. .................... | 235/375 |
| 2006/0165262 A1 * | 7/2006 | Genda ......................... | 382/115 |
| 2006/0165263 A1 * | 7/2006 | Niitsuma .................... | 382/115 |
| 2006/0291701 A1 | 12/2006 | Tanaka | |
| 2007/0086626 A1 * | 4/2007 | Mariani et al. .............. | 382/115 |
| 2008/0013796 A1 * | 1/2008 | Bonalle et al. .............. | 382/115 |

FOREIGN PATENT DOCUMENTS

| | | |
|---|---|---|
| JP | 2002-099515 A | 4/2002 |
| JP | 2002-108487 A | 4/2002 |
| JP | 2002-236667 A | 8/2002 |
| JP | 2003-141542 A | 5/2003 |
| JP | 2003-143136 A | 5/2003 |
| JP | 2005-202730 A | 7/2005 |

OTHER PUBLICATIONS

U.S. Appl. No. 11/234,766, filed Sep. 23, 2005.
Japanese Office Action dated Jun. 30, 2009, issued in counterpart Japanese Application No. 2008-015625, and English language translation thereof.
Japanese Office Action dated Sep. 29, 2009 and English translation thereof issued in a counterpart Japanese Application No. 2005-015625.

* cited by examiner

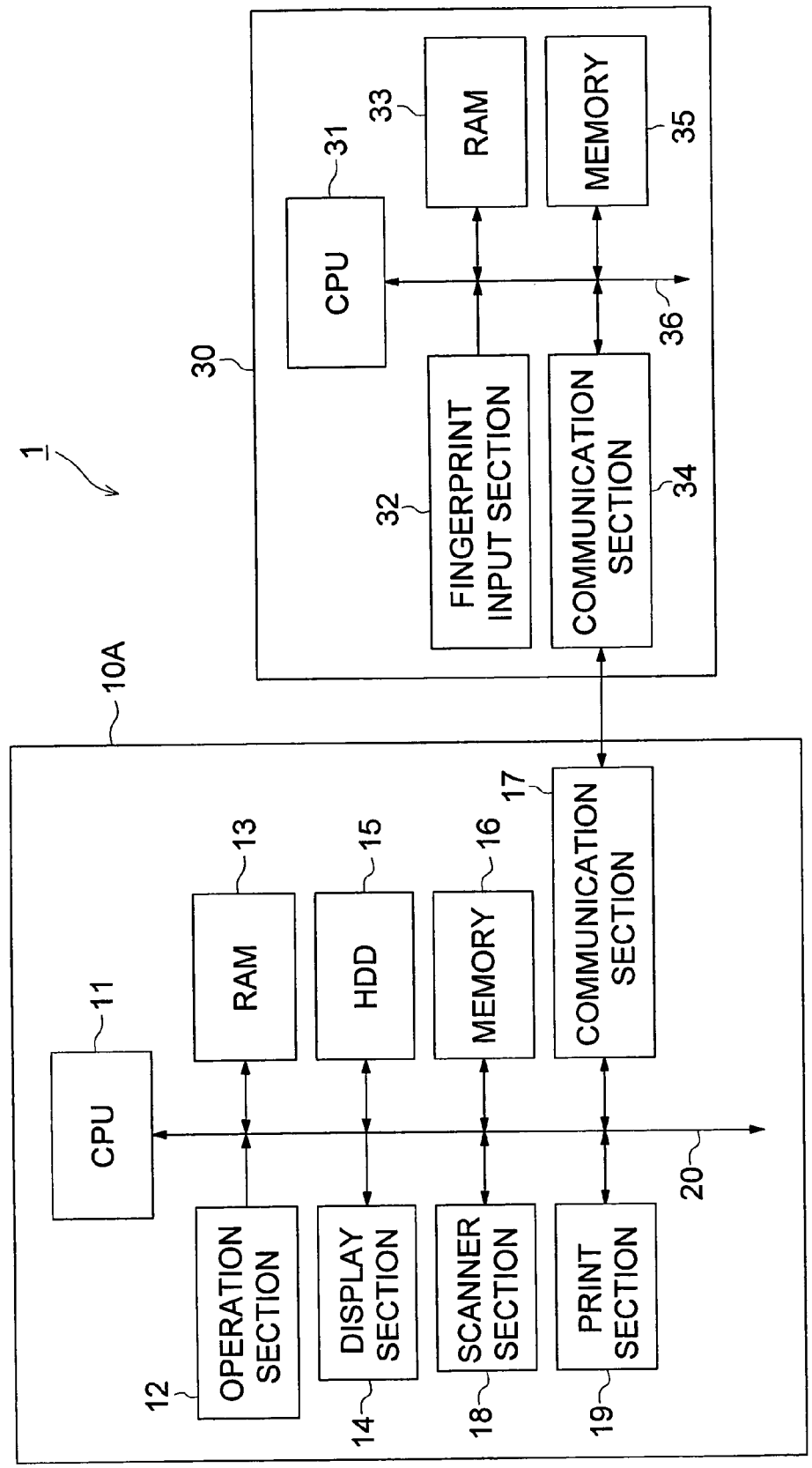

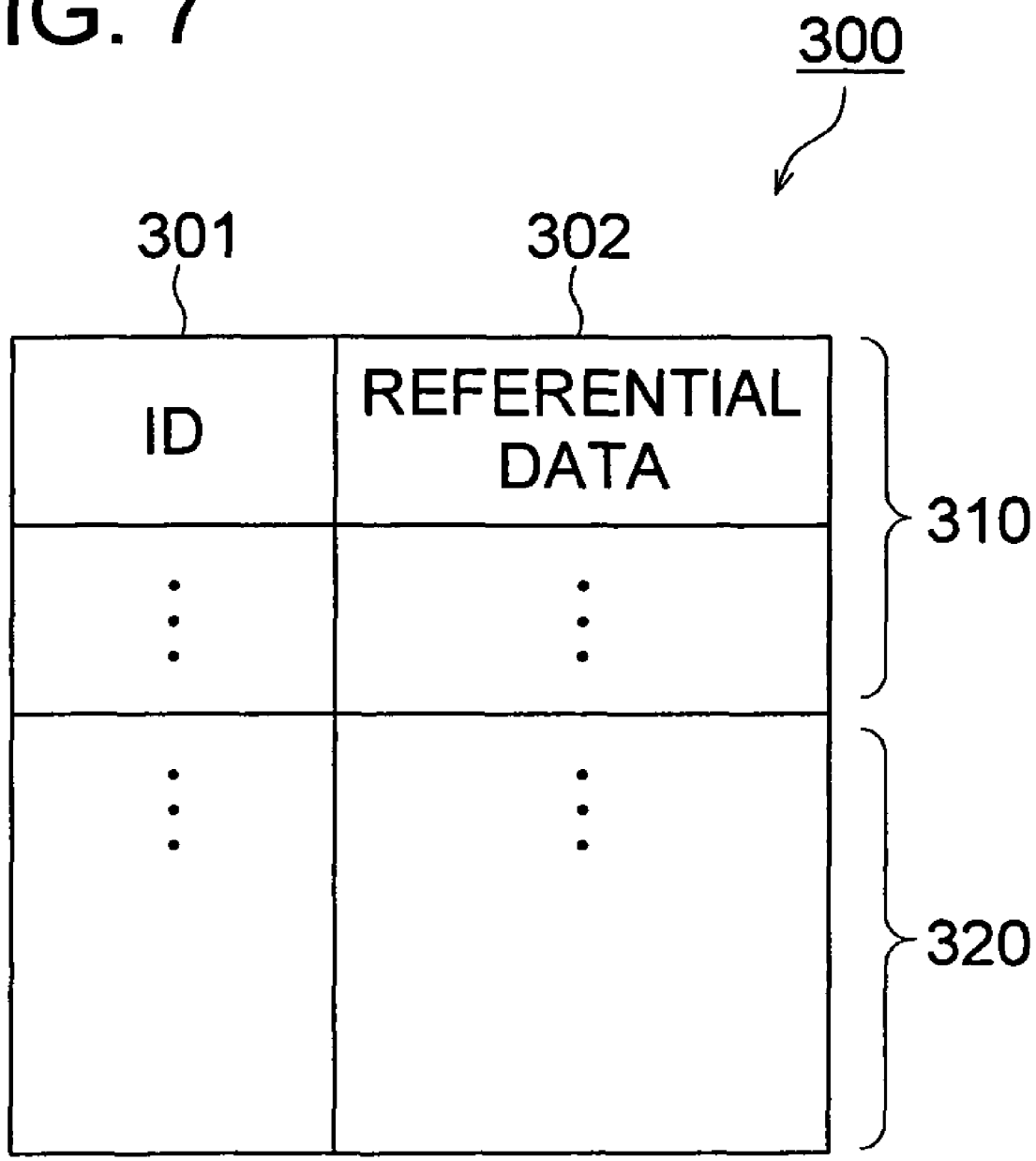

FIG. 12

| ID | REFERENTIAL DATA | LATEST DATE OF USAGE |
|---|---|---|
| ⋮ | ⋮ | ⋮ |
| ⋮ | ⋮ | ⋮ |

APPARATUS, SYSTEM AND METHOD FOR PERSON VERIFICATION

CROSS REFERENCE TO RELATED APPLICATION

The present application is based on Japanese Patent Application No. 2005-015625 filed with Japan Patent Office on Jan. 24, 2005.

BACKGROUND OF THE INVENTION

1. Field of the Invention

The present invention relates to an apparatus, system and method for person verification.

2. Description of Related Art

In the prior art, in order to ensure security, the IC (Integrated Circuit) card containing a record of the operator information of a person, operator ID (Identification) and password are inputted, and person identification is carried out using such inputted information. In particular, fingerprint verification using the fingerprint of each person as biological information has been carried out for person verification. Further, a technique has been proposed to use the image forming apparatus of a copier having a person verification function.

In the fingerprint verification, the registered fingerprint feature data of N persons (where "N" denotes two or more) is acquired and registered. The fingerprint feature data inputted by an operator at the time of verification is compared with the N pieces of feature data of the registered feature data group. Person verification is performed according to whether they match or not (according to whether there is any matching referential data) (hereinafter referred to as "1:N verification"). For example, if matched feature data is found by the fingerprint verification, the user is granted permission to use the copier. If matched feature data is not found, the user is not granted permission to use the copier. Such an arrangement is disclosed in Patent Document 1, for example.

A technique of person verification based on a combination of an ID and fingerprint has also been proposed. FIG. 13 shows the flow of a conventional person verification process. The following describes the conventional person verification process based on fingerprints to be performed using a copier provided with a fingerprint input section, a key input operation section and a memory section. Multiple pieces of feature data, each of which is associated with the ID of each person, are stored in the memory section of a copier.

As shown in FIG. 13, in the copier, an ID is inputted by the operator through the operation section (Step S91). A fingerprint is inputted by the operator through the fingerprint input section, and the feature data is generated from the fingerprint image data (Step S92). Using the inputted ID as a key, the referential data corresponding to the ID is obtained by searching the multiple pieces of referential data stored in the memory section (Step S93). The inputted feature data and the referential data corresponding to the ID are compared, and a decision step is taken to determine if they are matched or not (1:1 verification) (Step S94).

If they match (YES in Step S94), the permission to use the copier is set (Step S95), and the (conventional) person verification process terminates. After that, the operator having inputted the fingerprint can use the copier. If they do not match (NO in Step S94), the non-permission to use the copier is set (Step S96), and the (conventional) person verification process terminates. After that, the operator having inputted the fingerprint identifies through the ID and password (e.g., Patent Document 2).

[Patent Document 1] Japanese Unexamined Laid-Open Patent Publication NO. 2002-108487

[Patent Document 2] Japanese Unexamined Laid-Open Patent Publication NO. 2002-99515

In the prior art 1:N verification technique disclosed in the Patent Document 1, inputting of the ID for comparison is not required. Although this may facilitate the operation, a longer verification time is required if there is an increase in the number (N) of the pieces of data for comparison with the inputted feature data. Further, the increase in the number (N) of the pieces of data results in an increase in the number of the pieces of mutually similar data, with the result that precision in person verification is deteriorated in the prior art.

In the conventional 1:1 verification method disclosed in the Patent Document 2, the number of the pieces of referential data for comparison is "1". Although this means a shorter matching time without precision in person verification being deteriorated, ID inputting is obligatory in all verifications. This has raised the problem of reduced user convenience in person verification.

SUMMARY OF THE INVENTION

The object of the present invention is to improve precision in person verification, to reduce verification time and to enhance user convenience in person verification.

The above object of the present invention can be achieved by the following structure:

(1) A person verification apparatus comprising:

a biological information input section to receive an input of biological information of a person and to obtain data of the biological information as data to be verified;

an ID input section to receive an input of ID of a person; and a control section to compare the data to be verified with plural pieces of referential data registered in advance, and to obtain referential data corresponding to the ID received by the ID input section and compare whether the referential data corresponding to the ID matches with the datum to be verified when the data to be verified does not match with the plural referential data.

BRIEF DESCRIPTION OF THE DRAWINGS

FIG. 1 is a block diagram representing the configuration of the copier 1 as a first embodiment of the present invention;

FIG. 7 is a diagram representing the configuration of a registered data group 300:

FIG. 12 is a diagram representing the configuration of a fourth registered data group 400.

DETAILED DESCRIPTION OF THE PREFERRED EMBODIMENT

Figure 2A:
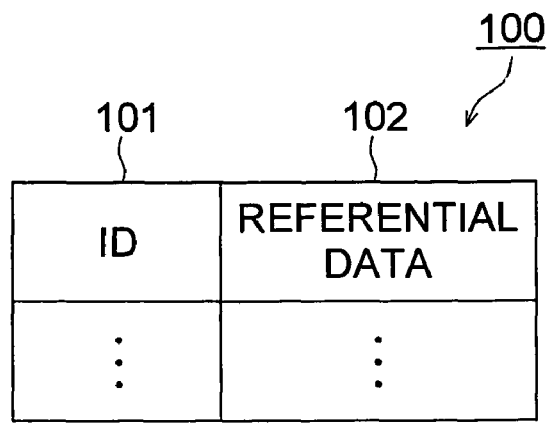
FIG. 2(a) is a diagram representing the configuration of a first registered data group 100.

The above object of the present invention can be further achieved by any one of the following structures:

(2) A person verification apparatus comprising:

a biological information input section to receive an input of biological information of a person and to obtain data of the biological information as data to be verified;

an ID input section to receive an ID input of a person; and a control section to compare the data to be verified with referential data which being a portion of a registered data group, and to prompt inputting of ID through the ID input section when the data to be verified does not match with the referential data.

(3) A person verification apparatus, comprising:

a memory section to store a registered data group containing plural pieces of biological information data as referential data;

a biological information input section to receive an input of biological information of a person and to obtain data of the biological information as data to be verified; and an ID input section to receive an input of ID of a person, wherein the registered data group comprises a first registered data group including referential data of specific biological information, and a second registered data group containing plural pieces of referential data and IDs which respectively correspond to the plural pieces of referential data.

(4) A person verification system comprising a person verification apparatus, and an information processing apparatus connected with the person verification apparatus to be capable of mutual communication, the person verification apparatus comprising:

a first memory section for storing a first registered data group including living information data as referential data;

a biological information input section to receive an input of biological information of a person and to obtain data of the biological information as data to be verified;

an ID input section to receive an input of ID of a person; and a first communication section to communicate with the information processing apparatus; and a control section to compare the data to be verified obtained by the biological information input section with the referential data in the first registered data group, wherein when the data to be verified does not match with the referential data in the first registered data group, the control section requires and receives a referential data corresponding to the ID obtained by the ID input section from the information processing apparatus, and compares whether the data to be verified matches with the referential data received from the information processing apparatus, and the information processing apparatus comprising:

a second memory section to store a second registered data group containing plural pieces of referential data and IDs which respectively correspond to the second pieces of plural referential data;

a second communication section to communicate with the person verification apparatus; and a second control section to receive the requirement of the referential data corresponding to the ID, to search the referential data corresponding to the ID in the second registered data group stored in the second memory section, and to send the referential data to the person verification apparatus.

(5) A person verification system comprising a person verification apparatus, and an information processing apparatus connected with the person verification apparatus to be capable of mutual communication, the person verification apparatus comprising:

a first memory section for storing a first registered data group including biological information data as referential data;

a biological information input section to receive an input of biological information of a person and to obtain a data of the biological information as a data to be verified;

an ID input section to receive an input of ID of a person;

a first communication section to communicate with the information processing apparatus; and a control section to compare the data to be verified obtained by the biological information input section with the referential data in the first registered data group, wherein when the data to be verified does not match with the referential data in the first registered data group, the control section prompts inputting of ID through the ID input section, and the information processing apparatus comprising:

a second memory section to store a second registered data group containing plural pieces of referential data and IDs which respectively correspond to the second plural referential data;

a second communication section to communicate with the person verification apparatus; and a second control section to search the referential data corresponding to the ID inputted through the ID in the second registered data group stored in the second memory section, and to send the referential datum to the person verification apparatus.

(6) A person verification system comprising a person verification apparatus, and an information processing apparatus connected with the person verification apparatus to be capable of mutual communication, the person verification apparatus comprising:

a first memory section for storing a first registered data group including living information data as referential data;

a biological information input section to receive an input of biological information of a person and to obtain a datum of the biological information as data to be verified;

an ID input section to receive an input of ID of a person; and a first communication section to communicate with the information processing apparatus, and the information processing apparatus comprising:

a second memory section to store a second registered data group containing plural referential data; and a second communication section to communicate with the person verification apparatus, wherein the second registered data group is stored in the second memory section so that each of the referential data is correlated with an ID.

(7) A person verification method comprising:

obtaining a biological information data as a data to be verified by receiving an input of biological information of a person;

comparing whether the data to be verified matches with each piece of referential data in a first registered data group containing biological information data as the referential data;

receiving an input of ID of the person who inputted the biological information, when the data to be verified does not match with the each piece of referential data in the first registered data group;

obtaining a piece of referential data corresponding to the received ID from a second registered data group containing plural piece of referential data and IDs which respectively correspond to the plural referential data; and comparing whether the data to be verified matches with the referential data obtained from the second registered data group.

(8) A person verification method comprising:

obtaining a biological information data as a data to be verified by receiving an input of biological information of a person;

comparing whether the data to be verified matches with a portion of referential data of a registered data group containing pieces of biological information data as the referential data; and urging to input an ID, when the data to be verified does not match with the portion of referential data in the registered data group.

Referring to the drawing, the following describes the first, second and third embodiments as well as variations in that order, without the prevent invention being restricted to the illustrated examples.

Embodiment 1

Referring to FIGS. 1 through 4, the following describes the first embodiment of the present invention. In the first place, the features of the apparatus as an embodiment of the present invention will be described with reference to FIG. 1. FIG. 1 shows the configuration of this embodiment.

The structure of the copier 1 as the person verification apparatus of the present embodiment will be described with reference to FIG. 1. The copier 1 comprises a copier main body 10A as an image forming section, and a fingerprint verification module 30, wherein the fingerprint verification module 30 is connected with the copier main body 10A.

The copier 1 comprises a CPU (Central Processing Unit) 11, operation section 12, RAM (Random Access Memory) 13, display section 14, HDD (Hard Disk Drive) 15, memory 16, communication section 17, scanner section 18 and print section 19. Each section is connected with a bus 20.

The CPU 11 provides central control of various sections inside the copier main body 10A. The CPU 11 allows the RAM 13 to expand the system program loaded in the HDD 15 or memory 16, and the program specified out of varieties of application programs. In collaboration with the programs expanded on the RAM 13, the CPU 11 performs various forms of processing.

The operation section 12 is provided with input keys and others. It is an ID input section for accepting the ID and other information of the person (operator) inputted by the operation of the operator as an input signal, and for outputting the input signal to the CPU 11. Without being restricted to the operation section 12, the ID input section can be a reader for reading the recorded ID from the recording medium such as IC card where the ID is recorded. The RAM 13 has a work area for storing the program, inputted data and result of processing, and stores the information on a temporary basis. The display section 14 is composed of an LCD (liquid crystal display) and others. Based on the display signal from the CPU 11, the display section 14 displays various operation screens. Further, the display section 14 can be integrated with the operation section 12 to form a touch panel.

The HDD 15 stores various forms of data such as image data and programs so that they can be read and written. The HDD 15 stores the first feature data providing program for applying the first referential data providing process to be described later, and the second registered data group 200.

The memory 16 is the image memory and local memory for storing the data used in the copier main body 10A. It is composed of a memory such as a flash memory for storing the data so that the data can be read and written, and the ROM (Read Only Memory) for storing the data that need not be rewritten.

The communication section 17 is connected to an external module through a communication cable or the like so that communication is possible between the two. The communication section 17 exchanges various forms of data with the external module.

The scanner section 18 reads the image recorded on the document and generates the image data of the image. The scanner section 18 comprises a light source for applying light to the document; an image sensor for photoelectric conversion of the light reflected from the document, such as a CCD (Charge Coupled Device) or a CMOS (Complementary Metal Oxide Semiconductor); a scanning section for scanning the light applied to the document; and an image processing section for applying various forms of conversion and processing to the electric signal read by the image sensor, and outputting image data.

A print section 19 is an inkjet, laser, thermal transfer, dot impact or other printer. Based on the image data inputted from the CPU 11, an image is formed and recorded on the recording medium such as recording paper.

The fingerprint verification module 30 is a biological information input section that accepts the input of the fingerprint image data as fingerprint information as biological information of the operator, and acquires the feature data based on the fingerprint image data. Noted here is that "fingerprint" preferably includes thumbprint in this specification. The fingerprint verification module 30 comprises a CPU 31, fingerprint input section 32, RAM 33, communication section 34 and memory 35. These sections are connected to the bus 36.

The CPU 31, RAM 33, communication section 34, and memory 35 have the same functions as the CPU 11, RAM 13, communication section 17 and memory 16, respectively. The CPU 31 provides central control of various sections inside the fingerprint verification module 30. A control section is configured through the collaboration of the CPU 31, RAM 33 and memory 35, similarly to the case of the CPU 11, RAM 13 and HDD 15. The communication section 34 permits communication with the copier proper 10A. The memory 35 stores various pieces of data so that they can be read and written. In particular, the memory 35 memorizes the first person verification program for executing the first person verification process to be described later, and the first registered data group 100.

The fingerprint input section 32 reads the fingerprint of the index finger or the like of the operator as a fingerprint image data, and outputs the fingerprint image data to the CPU 31.

The CPU 31 generates the feature data showing the features of the fingerprint image data having been inputted. The feature data comprises the data representing the features of the fingerprint image, and is used to identify the fingerprint. In this embodiment, the fingerprint is scanned with the finger placed in position on the finger print section 32, which comprises two-dimensional area image sensor. However, it is also possible to use the sweep method wherein the fingerprint is scanned with the finger being slid on a one-dimensional image sensor.

Figure 2B:
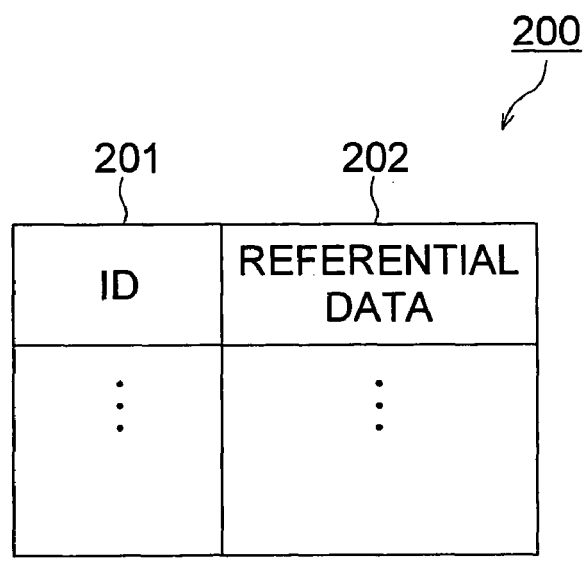
FIG. 2(b) is a diagram representing the configuration of a second registered data group 200.
Figure 2C:
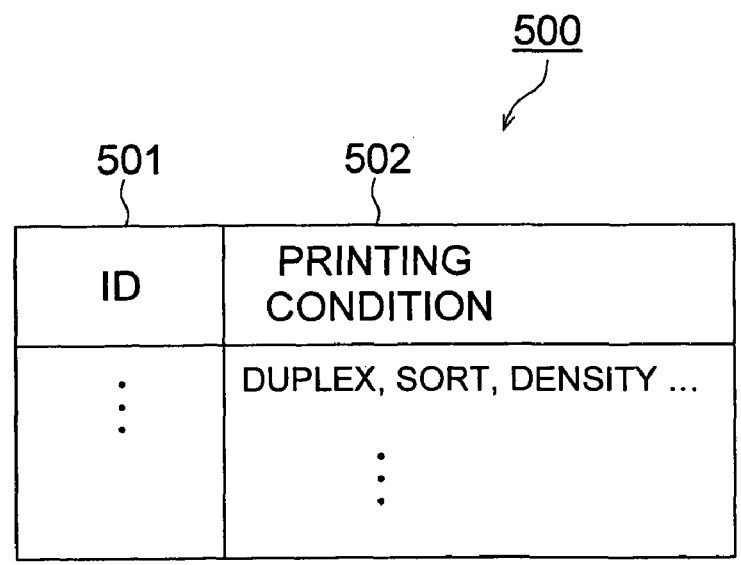
FIG. 2(c) is a diagram representing the configuration of individual setting information 500.

Referring to FIG. 2, the following describes the data stored in the copier 1. FIG. 2(*a*) shows the configuration of the first registered data group 100. FIG. 2(*b*) represents the configuration of the second registered data group 200. FIG. 2(*c*) shows the configuration of the individual setting information 500. Each of them constitutes a table or a database.

The memory 35 of the fingerprint verification module 30 stores the first registered data group 100 containing the IDs 101 for a plurality of persons registered in advance, as shown in FIG. 2(*a*) and the multiple pieces of registered feature data (hereinafter referred to as "referential data") corresponding to IDs 101. The HDD 15 of the copier main body 10A stores the second registered data group 200 containing the IDs 201 for a plurality of persons registered in advance, as shown in FIG. 2(*b*) and the multiple pieces of referential data 202 corresponding to IDs 201. However, it is also possible to arrange such a configuration that the second registered data group 200 is stored in the memory 16.

For example, the ID of the person to be registered is acquired by inputting through the operation section 12 or the like of the copier proper 10A, and the feature data of the fingerprint is acquired by inputting the fingerprint through the fingerprint input section 32 or the like, associated with the ID. This procedure allows the ID 201 of each record of the second registered data group 200 and the referential data 202 to be registered.

In a similar manner, the ID 101 of each record of the first registered data group 100 and the referential data 102 are also registered. The individuals registered in the first registered data group 100 may or may not be registered in the second registered data group 200.

It is preferred that the first registered data group 100 should have a record for the 1:N verification mode to be described later, and should correspond to the pieces of referential data smaller in number than those of the referential data contained in the second registered data group 200. For example, it preferably has the referential data 102 of the operator who makes a frequent use of the copier 1. The second registered data group 200 can include the ID 201 and referential data 202 of the operator containing the first registered data group 100. The number of the records of the first registered data group 100 can be fixed or variable. The content (person) of each record of the first registered data group 100 can be fixed or variable. In the present embodiment, the following describes the case where the content of each record of the first registered data group 100 is fixed.

For example, assume a structure wherein the feature data of the person making a frequent use of the copier 1 is registered or changed as the record of the first registered data group 100, by inputting of a manager through the operation section 12 of the copier 1. The second registered data group 200 has a 1:1 verification record to be described later.

The HDD 15 of the copier proper 10A stores the individual setting information 500 containing the IDs 501 for a plurality of persons registered in advance as shown in FIG. 2(*c*) and a plurality of printing conditions 502 associated with IDs 501.

In this case, the individual setting information 500 can be stored in the memory 16.

The printing conditions 502 are the printing conditions, in the print section 19 during the use of the copier 1, set in advance for each person corresponding to each of the IDs 501. They include the double/single printing condition, sort condition and density condition of a printed piece.

Figure 3A:
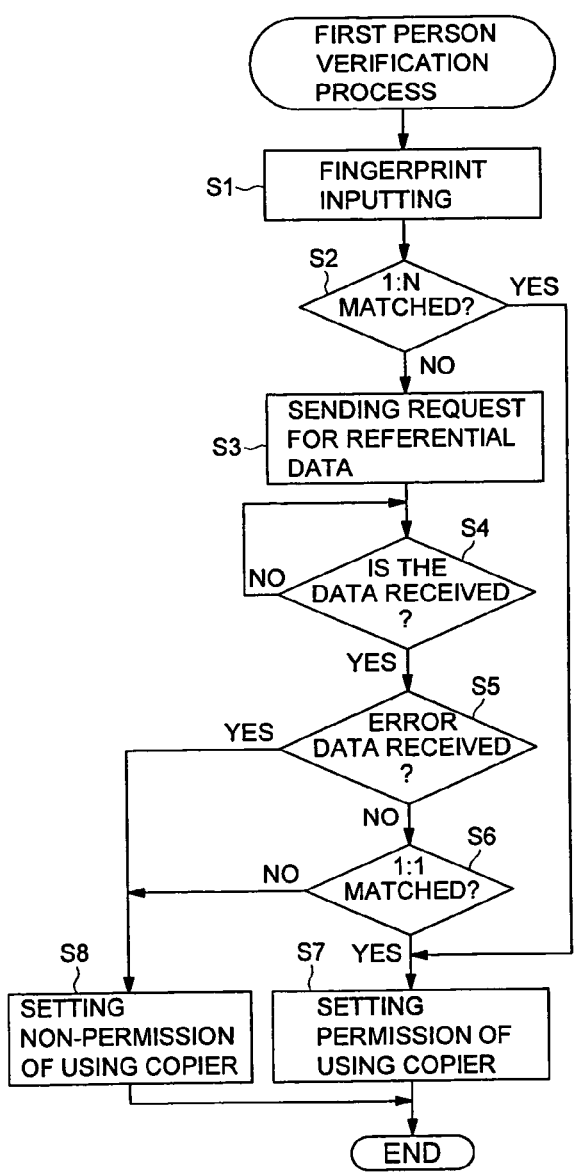
FIG. 3(a) is a flowchart representing the first person verification process to be executed by a fingerprint verification module 30.
Figure 3B:
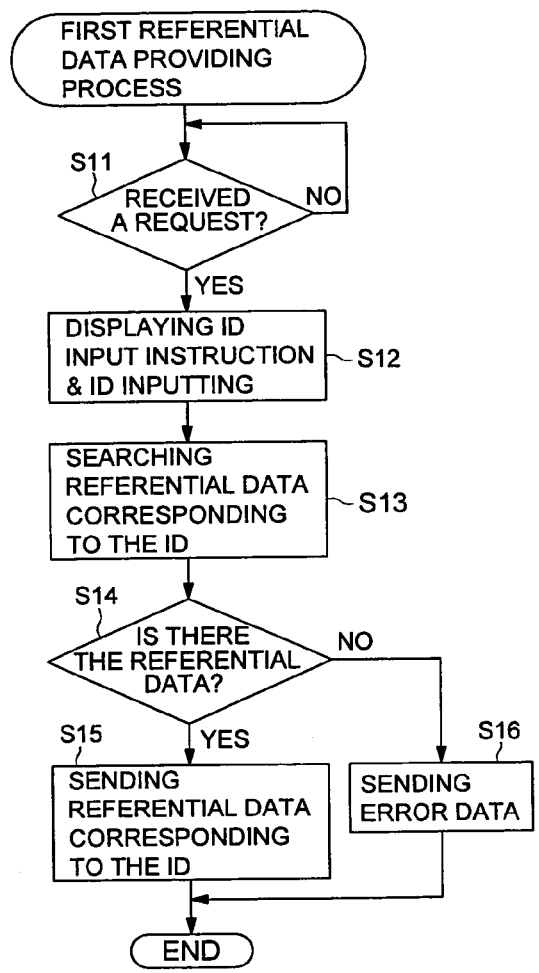
FIG. 3(b) is a flowchart representing the first referential data providing process to be executed by a copier proper 10A.
Figure 4:
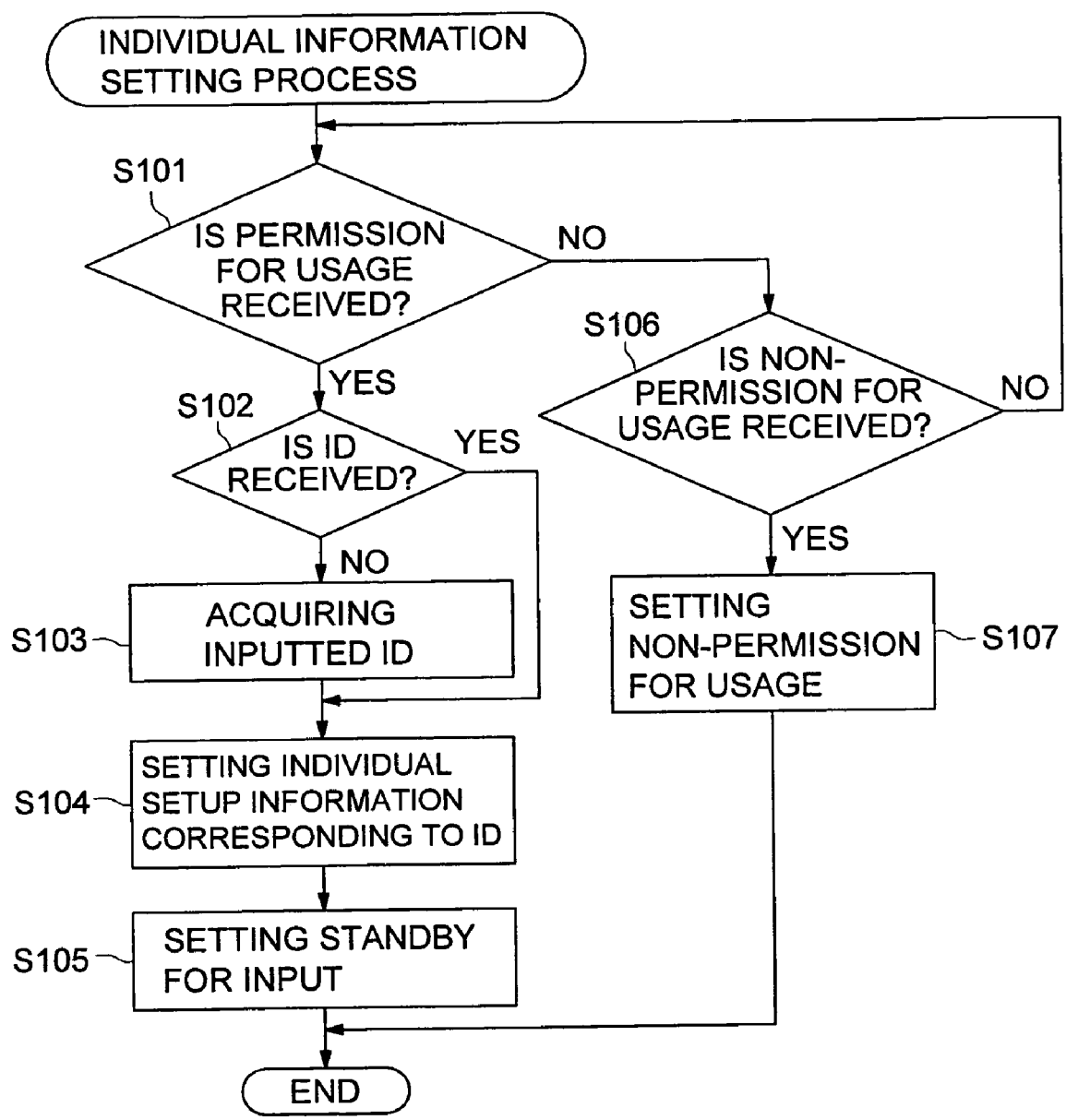
FIG. 4 is a flowchart representing the individual information setting process to be executed by a copier proper 10A.

Referring to FIGS. 3 and 4, the following describes the operation of the copier 1. FIG. 3(*a*) shows the flow of the first person verification process to be executed by the fingerprint verification module 30. FIG. 3(*b*) shows the flow of the first referential data providing process to be executed by the copier proper 10A. FIG. 4 shows the flow of the individual information setting process to be executed by the copier main body 10A.

The flow of the first person verification process to be executed by the fingerprint verification module 30 will be described first. For example, the first person verification process (and first referential data providing process) execution instruction is inputted from the operation section 12. Upon receipt of the execution instruction from the copier main body 10A through the communication section 34, the first person verification program is adequately read out of the memory 35, and is expanded on the RAM 33. The first person verification process is executed through collaboration between the CPU 31 and first person verification program.

In the first place, the fingerprint is inputted by the operator through the fingerprint input section 32, and the feature data of that fingerprint is obtained (Step S1). The first registered data group 100 stored in the memory 35 is read out, and then, the fingerprint feature data (data to be verified) inputted in the Step S1 is compared with the referential data 102 of the first registered data group 100 (by 1:N verification) to determine if there is a match or not (if there is any matching referential data or not) (Step S2).

When the data to be verified, obtained from the fingerprint inputted through the fingerprint input section 32, is compared with the referential data 102 of the first registered data group 100 (by 1:N verification), comparison is made to determine matching between a plurality of feature points of the data to be verified and a plurality of feature points of the referential data 102. However, it hardly happens that matching is found in all feature points. If the percentage of matching between the data to be verified and referential data 102 (degree of similarity) is equal to or greater than a predetermined threshold value, they are assumed to be matched. If the percentage of matching below a predetermined threshold value, they are assumed to be unmatched. The same procedure is used to determine if there is a match or not, when comparison is made between the referential data 202 corresponding to the ID inputted from the operation section 12, obtained from the second registered data group 200 to be described later, and the data to be verified, obtained from the fingerprint inputted through the fingerprint input section 32 (by 1:1 verification).

If no match is found in the 1:N verification (NO in Step S2), the request for the referential data corresponding to the ID of the operator having inputted the fingerprint is sent to the copier main body 10A through the communication section 34 (Step S3). A decision step is taken to determine whether or not the data (search error data or referential data corresponding to the ID), as a reply to the request for the ID of the operator having inputted the fingerprint that has been sent, has been received from the copier main body 10A through the communication section 34 (Step S4). If the data has not been received (NO in Step S4), the system goes to Step S4.

If the data has been received (YES in Step S4), a decision step is taken to determine if the received data is the data showing the (referential data search) error or not (Step S5). If the received data is not the data showing the error (NO in Step S5), then the received data is the referential data corresponding to the ID of the operator having inputted the fingerprint (referential data corresponding to the ID searched out of the second registered data group 200). Comparison is made between the data to be verified inputted in Step S1 and the referential data corresponding to the ID having been received (by 1 verification) to determine if there is a match (Step S6).

If matching is found by the 1:N verification (YES in Step S2) or by the 1:1 verification (YES in Step S6), the operator is identified as the registered person, and the message is sent to the copier main body 10A through the communication section 34 (Step S7) to show that the operator having inputted the fingerprint is granted permission to use the copier 1. Then the first person verification process terminates. In Step S7, the ID 101 of the matched referential data 102 is obtained from the first registered data group 100 in the case of YES in Step S2. The obtained ID is sent to the copier main body 10A, together with the message that the operator is granted the permission to use the copier 1.

If the received data is the data showing an error (YES in Step S5), or a match is not found by the 1:1 verification (NO in Step S6), the operator cannot be identified as the person registered in advance. Thus, the message is sent to the copier main body 10A through the communication section 34 to show that the operator having inputted the fingerprint is not granted permission to use the copier 1 (Step S8). Then the first person verification process terminates.

In response to first person verification process the following describes the first referential data providing process to be executed in the copier main body 10A. For example, upon inputting of the instruction to execute first person verification process (and first referential data providing process) through the communication section 34, the first referential data providing process is read out of the HDD 15 as appropriate, and is expanded on the RAM 13. Then the first referential data providing process is executed through collaboration between the CPU 11 and first referential data providing process having been expanded.

A decision step is taken to determine if the request for the referential data, corresponding to the ID of the operator having inputted the fingerprint, having been sent in the Step S3, has been received from the fingerprint verification module 30 through the communication section 17 (Step S11). If the request for referential data has not been received (NO in Step S11), the system proceeds to Step S11. If the request for referential data has been received (YES in Step S11), a message is displayed on the display section 14 to prompt the operator to input the fingerprint. The ID is inputted by the operator having inputted the fingerprint through the operation section 12.

The second registered data group 200 stored in the HDD 15 is searched to find out the referential data corresponding to the ID inputted in the Step S12 (Step S13). A decision step is taken to determine if the referential data corresponding to the ID is present or not (YES in Step S14). If there is referential data corresponding to the ID (YES in Step S14), the referential data corresponding to the ID is sent, in response to Step S4, to the fingerprint verification module 30 through communication section 17 (Step S15). Then the first referential data providing process terminates. If there is no referential data corresponding to the ID (NO in Step S14), an error message is sent, in response to Step S4, to the fingerprint verification module 30 through the communication section 17 to indicate that the referential data corresponding to the ID is not found (Step S16).

In response to the first person verification process and first referential data providing process, the following describes the individual information setting process to be executed in the copier main body 10A. For example, immediately after the instruction to execute the first person verification process (and first referential data providing process) has been inputted through the operation section 12, the individual information setting program is read out of the HDD 15 as appropriate and is expanded on the RAM 13. Then individual information setting process is executed through collaboration between the CPU 11 and the individual information setting program being expanded.

In the first place, in response to the first person verification process in Step S7, a decision step is taken to determine whether or not a message notifying the permission to use the copier 1 has been received from the fingerprint verification module 30 through the communication section 34 (Step S101). When the message notifying the permission to use the copier 1 has been received (YES in Step S101), based on the message notifying the permission to use the copier 1, a decision step is taken to determine whether or not the ID of the operator having been granted permission has been received from the fingerprint verification module 30 through the communication section 34 (Step S102).

When the ID has not been received (NO in Step S102), matching is found in a 1:1 verification. Thus, the ID of an operator, having been granted permission to use the copier, inputted in the Step S12 of the first referential data providing process, is acquired (Step S103). Then reference is made to the individual setting information 500 stored in the HDD 15. The printing condition 502 as the individual setting information corresponding to the ID having been acquired and received is scanned and set (Step S104). When the ID has been received (YES in Step S102), matching is found in a 1:N verification, and the system proceeds to Step S104.

Then the copier 1 is set to the input wait mode wherein the system waits for various forms of inputs from the operator (setting of the document and printing paper, inputting of the instruction to execute printing, through the operation section 12, etc.) (Step S105). This leads to the termination of the individual information setting process.

If the message notifying the permission to use the copier 1 has not been received (NO in Step S101), in response to the first person verification process in Step S8, a decision step is taken to determine whether or not a message notifying the non-permission to use the copier 1 has been received from the fingerprint verification module 30 through the communication section 34 (Step S106). The message notifying the non-permission to use the copier 1 is set on the copier 1 (Step S107). This procedure disables the copier 1 to be used by the operator having inputted the fingerprint, and the individual information setting process terminates. If the message notifying the non-permission to use the copier 1 has not been received (NO in Step S106), the system goes to Step S101.

The present embodiment allows the success or failure of person verification to evaluated by comparison between the feature data obtained from the fingerprint input section 32 (data to be verified) and the referential data of the first registered data group 100 having a smaller number of records than the second registered data group 200. This arrangement makes it possible to reduce the capacity of the memory 35 for storing the first registered data group 100, as compared with the case where the second registered data group 200 is used.

This arrangement also enhances precision in person verification and reduces the verification time. Further, if matching is not found in Step S2, the referential data corresponding to the ID inputted from the operation section 12 is obtained from the second registered data group 200. Thus, success or failure of person verification can be evaluated by comparison between the data to be verified, obtained by the fingerprint verification module 30 and the referential data corresponding to the ID obtained from the second registered data group 200. Accordingly, verification time can be reduced by the 1:1 verification, and frequent ID input operation can be avoided, thereby enhancing convenience in person verification. Further, since feature data is compared with feature data at all times, the security in person verification is enhanced.

In the comparison of individual feature data, a decision is made depending on whether or not the percentage of matching of the feature data is equal to or greater than a predetermined threshold value. This provides more adequate determination of the success or failure in person verification.

If matching of the feature data (the data to be verified and referential data) has been reached, permission to use the copier 1 is set only for the specified operator, thereby improving the security in granting the permission to use the copier 1, and enhancing the security in accessing the image data for printing stored in the HDD 15 of the copier 1.

When the first registered data group 100 has the referential data of biological information on a plurality of persons frequently using the copier 1, this arrangement reduces the frequency of person verification by comparison between the inputted data and referential data corresponding to the ID (frequency of passing through the Step S3). It also reduces the verification time and improves precision in verification, thereby enhancing convenience in person verification.

When the 1:1 verification has failed, the ID input instruction is indicated on the display section 14 to notify the operator to input the ID wherever required. The first registered data group 100 and second registered data group 200 are stored in different memory sections (HDD 15 and memory 35). This arrangement reduces the storage capacity of the memory 35 for storing the first registered data group 100.

The referential data and ID are always paired as a set. When the first registered data group 100 is used, the corresponding ID 101 is automatically fetched from the matched referential data 102. When the second registered data group 200 is used, the ID having been inputted can be identified. Further, the aforementioned ID and the setting for each are called up automatically to ensure that the copier 1 can be operated under the optimum conditions.

When the permission to use the copier 1 is granted to an operator, the printing condition 502 is set as the individual setting information in the present embodiment. Without the prevent invention being restricted thereto, the individual setting information can be the information that allows the operator granted the permission to use the operation screen particularly designed for that operator, the address book showing the destination of transmission, stamp, signature, confidential print and others.

Embodiment 2

Figure 5:
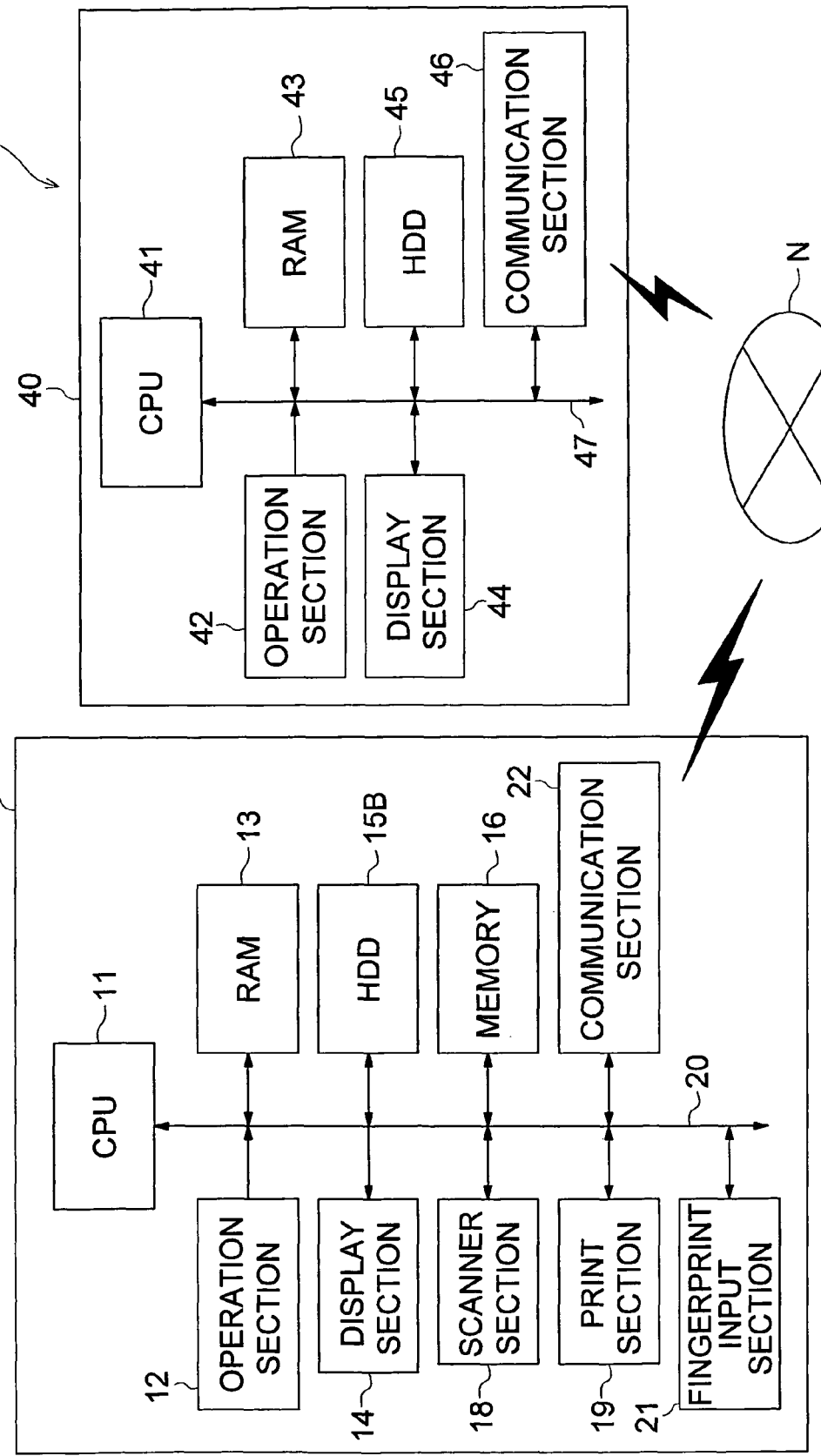
FIG. 5 is a block diagram representing the configuration of the copier 2 as a second embodiment of the present invention.
Figure 6A:
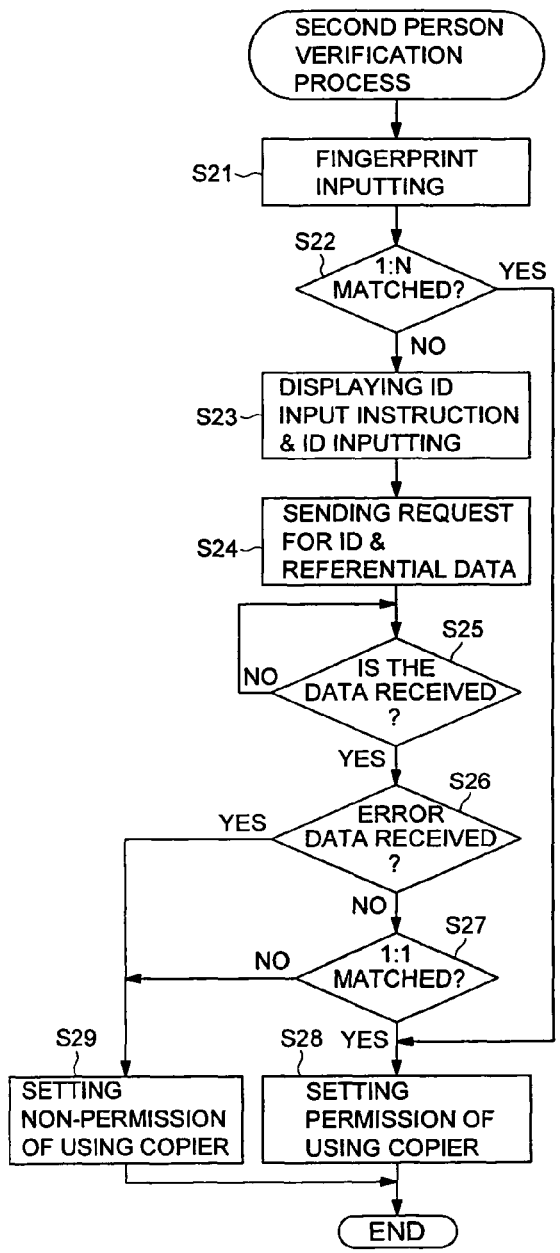
FIG. 6(a) is a flowchart representing the second person verification process to be executed by a copier 10B.
Figure 6B:
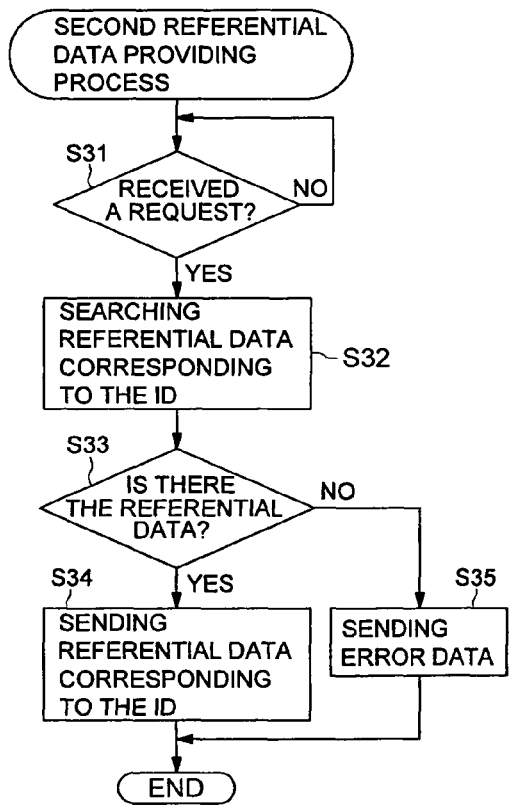
FIG. 6(b) is a flowchart representing the second referential data providing process to be executed by a server 40.

Referring to FIGS. 5 and 6, the following describes the second embodiment of the present invention. In the first place, the configuration of the apparatus of the present embodiment with reference to FIG. 5 will be described below. FIG. 5 shows the configuration of the copier system 2 of the present embodiment.

As shown in FIG. 5, the copier system 2 as a person verification system of the present embodiment comprises a copier 10B as a person verification apparatus and a server 40 as an information processing apparatus. They are connected for mutual communication through the communication network. The information processing apparatus can be a PC (personal computer) or an image forming apparatus of a copier or the like, instead of the server.

Similarly to the copier main body 10A, the copier 10B comprises a CPU 11, an operation section 12 as an ID input section for accepting the ID of a person (operator), a RAM 13, a display section 14, a memory 16, a scanner section 18 and a print section 19. Further, the copier 10B comprises an HDD 15B, a fingerprint input section 21 and a communication section 22. These sections are connected to the bus 20. Further, the first control section is configured through collaboration of the CPU 11, RAM 13 and HDD 15B.

Similarly to the HDD 15, the HDD 15B stores the second person verification program for executing the second person verification program, and the first registered data group 10A. The communication section 22 contains an NIC (Network Interface Card) and others, and exchange various forms of data with an external apparatus such as the server 40 through the communication network N.

The communication network N is an LAN (Local Area Network), for example. It can be composed of a WAN (Wide Area Network), a telephone line network, an ISDN (Integrated Service Digital Network), a wide-area communication line network, a leased line, a mobile communication network, a communication satellite line, CATV (community antenna television) line, an optical communications line, a radio communication line and an internet service provider connecting them.

Similarly to the fingerprint verification module of the first embodiment, the fingerprint input section 21 is a biological information input section for accepting the input of the fingerprint image data as the fingerprint information as the biological information of the operator, and for acquiring the feature data based on the fingerprint image data.

The server 40 comprises a CPU 41, an operation section 42, a RAM 43, a display section 44, an HDD 45, and a communication section 46. These sections are connected through the bus 47. The CPU 41 and RAM 43 are the same as the CPU 11 and 13, respectively. Further, the second control section is configured through collaboration of the CPU 41, RAM 43 and HDD 45. The operation section 42 has a key input device such as a keyboard. It may contain a pointing device such as a mouse. The display section 44 is a display section composed of a CRT (cathode ray tube) or LCD (liquid crystal display).

The communication section 46 is composed of an NIC (Network Interface Card) and exchanges various forms of data with an external apparatus such as a copier 10B through the communication network N. The HDD 45 has the same configuration as that of the HDD 15 of the first embodiment, except that it stores the second person verification program for executing the second person verification process and the second registered data group 200A.

The first registered data group 100A and the second registered data group 200A (not illustrated) are the same as the first registered data group 100 and the second registered data group 200 of the first embodiment.

Referring to FIG. 6, the following describes the operation of the copier system 2. FIG. 6(*a*) shows the flow of the second person verification process to be executed by the copier 10B. FIG. 6(*b*) shows the second referential data providing process to be executed by the server 40.

In the first place, the second person verification process executed by the copier 10B will be described. For example, immediately after an instruction to execute the second person verification process has been inputted from the operation section 12, the second person verification program is read out of the HDD 15B and is expanded on the RAM 13. The second person verification process is executed through collaboration between the CPU 11 and the second person verification program expanded on the RAM 13.

A fingerprint is inputted by the operator through the fingerprint input section 2, and the feature data of the fingerprint is acquired (Step S21). Then the first registered data group 100A stored in the HDD 15B is read out. Comparison is made between the feature data (data to be verified) of the fingerprint inputted in Step S21 and the referential data 102 of the first registered data group 100A (1:N verification). A decision step is taken to determine if matching is found or not (if matching data is present or not) (Step S22).

The description thereof will be omitted to avoid duplication because the decision step to determine if matching is found or not is the same as the one in the first embodiment in either of when comparison is made between the data to be verified, which is acquired from the fingerprint inputted through the fingerprint input section 21, and the referential data 102 of the first registered data group 100A (1:N verification), and when comparison is made between the referential data 202 corresponding to the ID inputted from the operation section 12 acquired from the second registered data group 200A and the data to be verified, which is acquired from the fingerprint inputted through the fingerprint input section 21 (1:1 verification).

If matching is not found in the 1:N verification (NO in Step S22), a message is indicated on the display section 14 to prompt the operator having inputted the fingerprint to input the ID. The operator ID is inputted through the operation section 12 by the operator having inputted the fingerprint (Step S23). The ID inputted in Step S23 and a request for the referential data corresponding to that ID are sent to the server 40 through the communication network N (Step S24). A decision step is taken to determine whether or not the data (search error data or referential data) as a reply to the request for the referential data corresponding to the ID having been sent has been received from the server 40 through the communication section 22 and communication network N (Step S25). If the data has not been received (NO in Step S25), the system goes to Step S25.

When the data has been received (YES in Step S25), a decision step is taken to determine whether or not the received data is the error data (referential data search error data) (Step S26). If the received data is not the error data (NO in Step S26), the received data is the referential data corresponding to the ID of the operator having inputted the fingerprint (referential data corresponding to the ID searched from the second registered data group 200). Comparison is made between the data of the fingerprint to be verified, inputted in Step S21, and the referential data corresponding to the received ID (1:1 verification). A decision step is taken to determine if matching is found or not (Step S27).

If matching has been found in the 1:N verification (YES in Step S22) or 1:1 verification (YES in Step S27), the operator is identified as the person registered in advance. Thus, the setting is made to ensure that permission to use the copier 10B is granted to the operator having inputted the fingerprint (Step S28). Then the second person verification process terminates. Thus, this arrangement enables use of the copier 10B by the operator having inputted the fingerprint. Similarly to the case of the first embodiment, the permission to use the copier 10B is preferably set by each operator using individual setting information.

If the received data is the error data (YES in Step S26), or matching is not found by 1:1 verification (NO in Step S27), the operator cannot be identified as the person registered in advance. Accordingly, the setting is made to ensure that permission to use the copier 10B is not granted to the operator having inputted the fingerprint (Step S29). Then the second person verification process terminates. Thus, this arrangement disables use of the copier 10B by the operator having inputted the fingerprint.

In response to the second person verification process, the following describes the second referential data providing process to be executed in the server 40. For example, immediately after the instruction to execute the second referential data providing process has been inputted through the communication section 46, the second referential data providing program is read out of the HDD 45, and is expanded on the RAM 43. Then the second referential data providing process is executed through collaboration between the CPU 41 and the second referential data providing program having been expanded.

A decision step is taken to determine whether or not the request for the referential data corresponding to the ID sent in the Step S23 has been received from the copier 10B through the communication section 46 (Step S31). If the request for the referential data is not received (NO in Step S31), the system proceeds to Step S31. When the request for the referential data is received (YES in Step S31), the second registered data group 200A stored in the HDD 45 to find the feature data corresponding to the ID having been received (Step S32).

A decision step is taken to determine whether or not there is the referential data corresponding to the ID having been received (Step S33). If there is the referential data corresponding to the ID (YES in Step S33), the referential data corresponding to ID is sent to the copier 10B through the communication section 46 and communication network N (Step S34). Then the second referential data providing process terminates. If there is no referential data corresponding to the ID (NO in Step S33), the error data representing the absence of referential data corresponding to the ID is sent to the copier 10B through the communication section 46 and communication network N (Step S35). Then the second person verification process terminates.

In the copier 10B of the present embodiment, the success or failure in person verification is determined by comparison between the data to be verified, obtained from the fingerprint input section 21, and the referential data of the first registered data group 100A. This arrangement makes it possible to reduce the capacity of the HDD 15B for storing the first registered data group 10A, as compared with the case where the second registered data group 200A is used. This arrangement also enhances precision in person verification and reduces the verification time. Further, if matching is not found in Step S22, the referential data corresponding to the ID inputted from the operation section 12 is received from the server 40 in response to the request made to the server 40. Thus, the success or failure of person verification is evaluated by comparison between the data to be verified obtained from the fingerprint input section 21 and the referential data corresponding to ID. Accordingly, verification time can be reduced by the 1:1 verification, and frequent ID input operation can be avoided, thereby enhancing convenience in person verification. Further, since one item of referential data is sent from the server 40 to the copier 10B, the amount of communication information is reduced. Furthermore, since feature data is compared with feature data at all times, the security in person verification is enhanced.

The copier 10B can be configured in such a way that the referential data on the fingerprints of a plurality of persons frequently using the copier 10B is received from the server 40 and is registered in the first registered data group 10A, or the data is updated.

Embodiment 3

Figure 8:
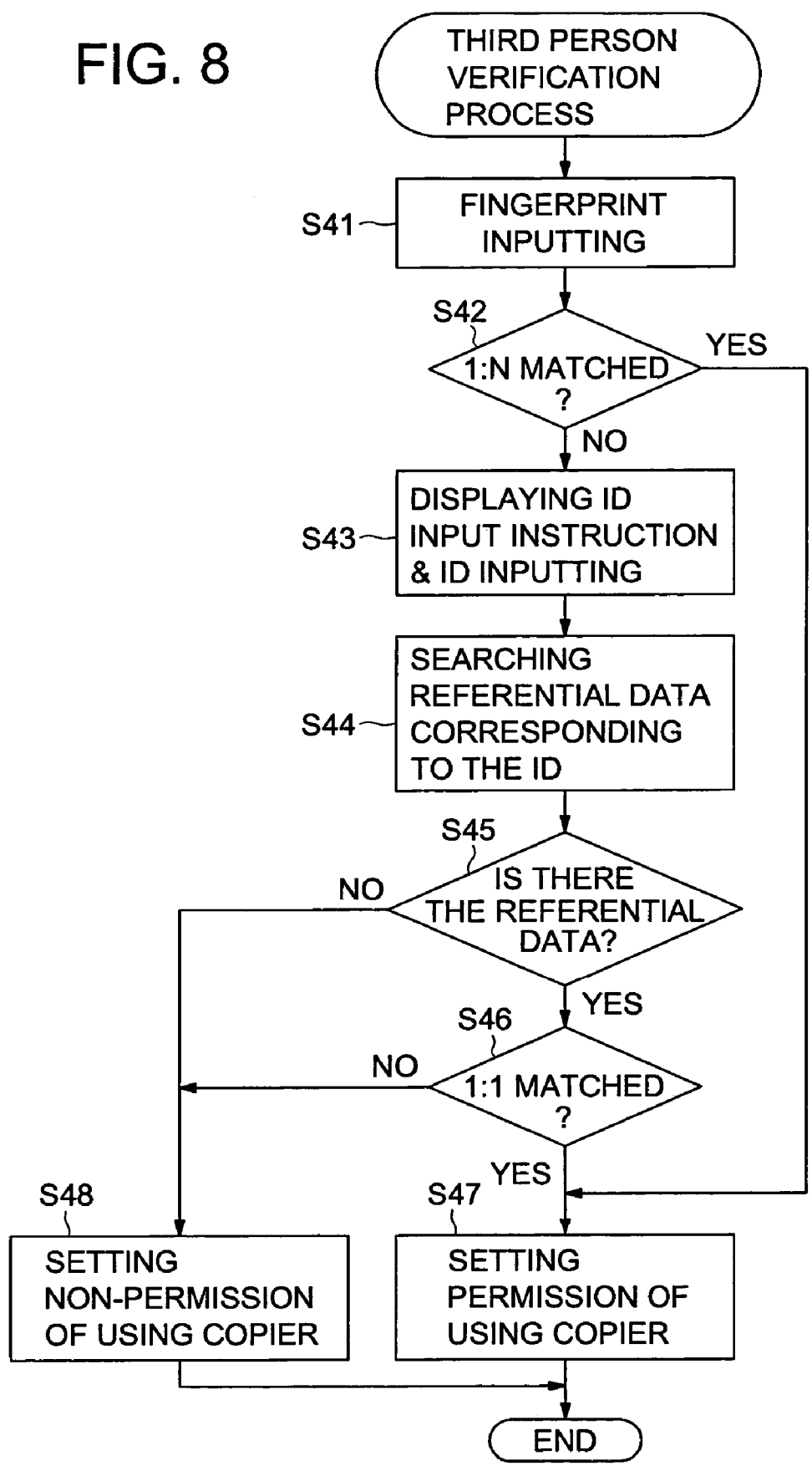
FIG. 8 is a flowchart representing the third person verification process to be executed by a copier 10B.

Referring to FIGS. 7 and 8, the following describes the third embodiment of the present invention. The copier 10B of the second embodiment is used as a single body as the apparatus of the present embodiment. They have the same configuration, except that the third person verification program for executing the third person verification process and the registered data group 300 are stored in the HDD 15B.

The registered data group 300 (a combined registered data group) stored in the HDD 15B will be described with reference to FIG. 7. FIG. 7 shows the configuration of the registered data group 300. The registered data group 300 contains the ID 301 and the referential data 302 corresponding to the ID 301. The registered data group 300 includes the first registered data group 310 having the records of a predetermined number of persons in the copier 10B and the second registered data group 320 having the records of the persons except for those in the first registered data group 310. The first registered data group 310 has a record for 1:N verification or authenticating and the second registered data group 320 has a record for 1:1 verification or authenticating. The first and second registered data groups 310 and 320 correspond to the first and second registered data groups 100 and 200 of the first embodiment, respectively.

As described above, the first and second registered data groups are configured as a single database, and are managed as such.

The record of the person registered in the first registered data group 310 is preferably that of the person making a frequent use of the copier 10B. Further, to identify the first and second registered data groups, each piece of data (each record) is preferably provided with an identification code so that they can be identified as a database.

Referring to FIG. 8, the following describes the operator of the copier 10B. FIG. 8 shows the flow of the third person verification process executed by the copier 10B.

The third person verification process to be executed by the copier 10B will be described below. For example, immediately after the instruction to execute the third referential data providing process has been inputted through the operation section 12, the third referential data providing program is read out of the HDD 15B, and is expanded on the RAM 13. Then the third referential data providing process is executed through collaboration between the CPU 11 and the third referential data providing program being expanded.

A fingerprint is inputted by the operator through the fingerprint input section 21, and the data of the fingerprint to be verified is acquired (Step S41). Then the first registered data group 310 stored in the HDD 15B is read out. Comparison is made between the data of the fingerprint to be verified, inputted in Step S41 and the referential data 302 of first registered data group 310 (by 1:1 verification). A decision step is taken to determine if matching is found or not (if matching referential data is present or not) (Step S42).

When comparison is made between the data to be verified, obtained from the fingerprint inputted in the fingerprint input section 21, and the referential data 302 of the first registered data group 310 (by 1:N verification), and when comparison is made between the referential data 302 corresponding to the ID inputted from the operation section 12 acquired from the second registered data group 320, and the data to be verified, acquired from the fingerprint inputted through the fingerprint input section 21 (1:1 verification), the decision step to determine if matching is found or not is the same as the one in the first embodiment. The description thereof will be omitted to avoid duplication.

If matching is not found in the 1:N verification (NO in Step S42), a message is indicated on the display section 14 to prompt the operator having inputted the fingerprint to input the ID. The operator ID is inputted through the operation section 12 by the operator having inputted the fingerprint (Step S43). The second registered data group 320 stored in the HDD 15B is searched to find out the referential data corresponding to the ID inputted in the Step S43 (Step S44). A decision step is taken to determine if there is the referential data corresponding to the ID or not (Step S45).

If there is the referential data corresponding to the ID (YES in Step S45), comparison is made between the data of the fingerprint to be verified, inputted in Step S41 and the referential data corresponding to the ID having found out by search (1:1 verification). A decision is made to see if matching is found or not (Step S46).

If matching is found by the 1:N verification (YES in Step S42) or by the 1:1 verification (YES in Step S46), the operator is identified as the person registered in advance. Thus, the setting is made to ensure that permission to use the copier 10B is granted to the operator having inputted the fingerprint (Step S47). Then the third person verification process terminates. Thus, this arrangement enables use of the copier 10B by the operator having inputted the fingerprint. Similarly to the case of the first embodiment, the setting of the permission to use the copier 10B is preferably made for each operator using the individual setting information.

If there is no referential data corresponding to the ID (NO in Step S45), or matching is not found by the 1:1 verification (NO in Step S46), the operator cannot be identified as the person registered in advance. Accordingly, the setting is made to ensure that permission to use the copier 10B is not granted to the operator having inputted the fingerprint (Step S48). Then the third person verification process terminates. Thus, this arrangement disables use of the copier 10B by the operator having inputted the fingerprint.

In the present embodiment, similarly to the case of the first embodiment, the success or failure in person verification is determined by comparison between the data to be verified, obtained from the fingerprint input section 21 and the referential data of the first registered data group 310. This arrangement makes it possible to reduce the capacity of the first registered data group 310, as compared with the case where the second registered data group 320 is used. This arrangement also enhances precision in person verification and reduces the verification time. Further, if matching is not found in Step S42, the referential data corresponding to the ID inputted from the operation section 12 is obtained from the second registered data group 320. Thus, the success or failure of person verification is evaluated by comparison between the data to be verified obtained from the fingerprint input section 21 and the referential data corresponding to ID obtained from the second registered data group 320. Accordingly, verification time can be reduced by the 1:1 verification, and frequent ID input operation can be avoided, whereby the security in person verification is enhanced.

The first and second registered data groups 310 and 320 stored in one and the same memory section (HDD 15B) eliminates the need of providing a step for communication between different memory sections, this step being indispensable when they are stored in different memory sections. This arrangement ensures smooth processing when the second 1:1 verification is performed subsequent to the first 1:N verification, with the result that high-speed verification processing is achieved.

[Variation 1]

Figure 9:
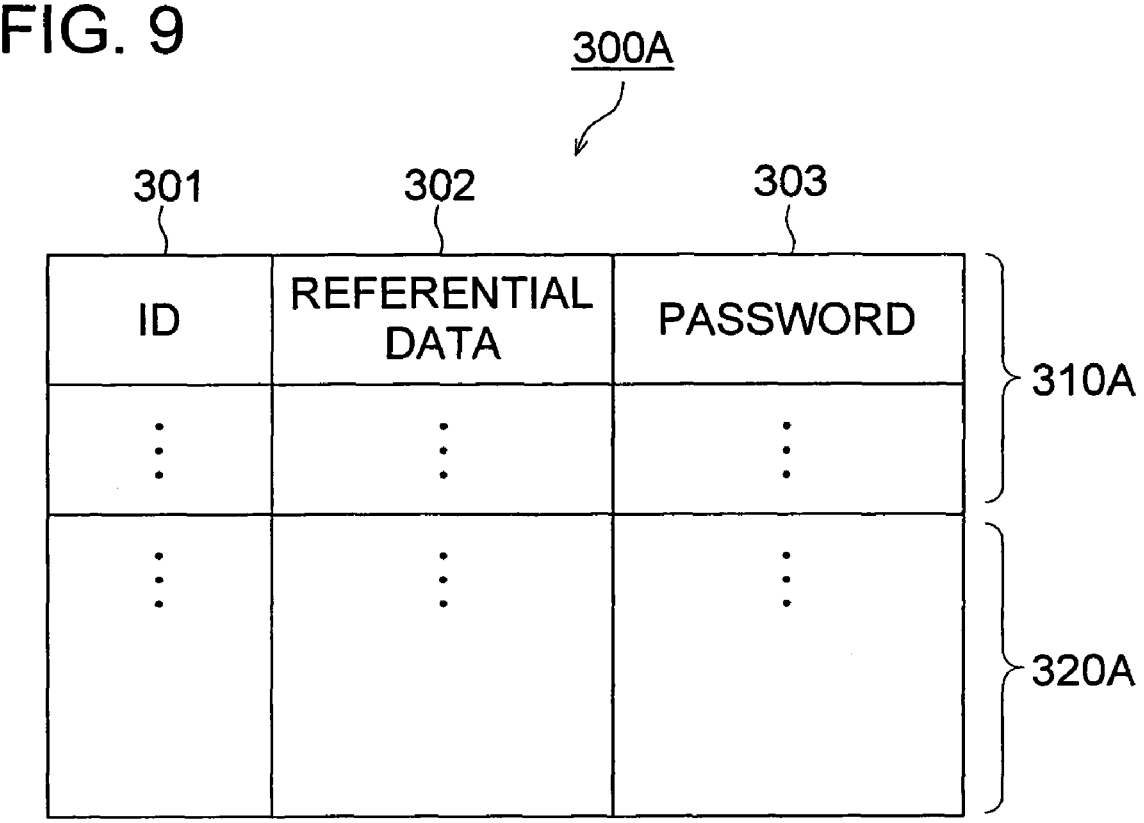
FIG. 9 is a diagram representing the configuration of a third registered data group 300A.
Figure 10:
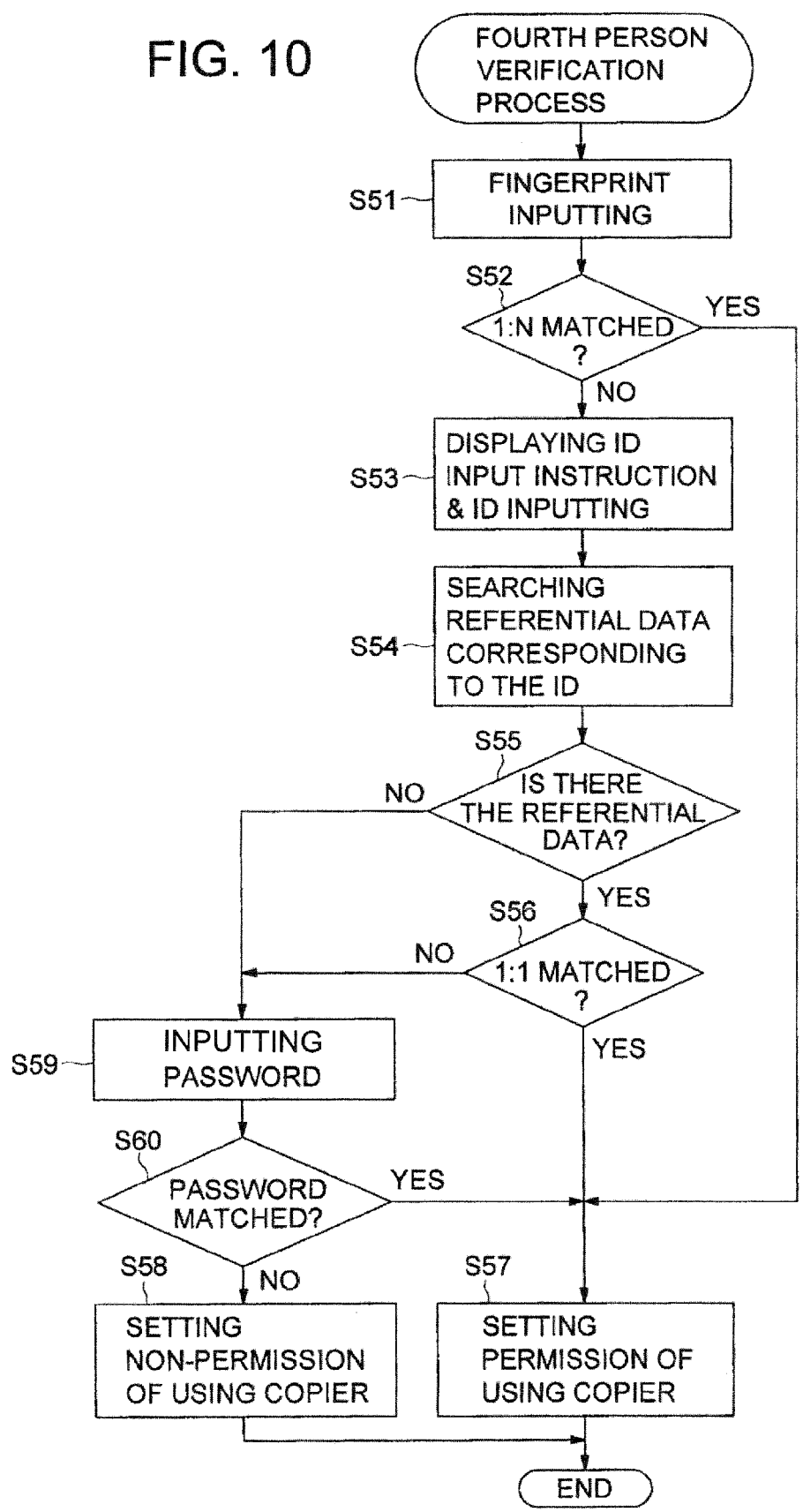
FIG. 10 is a flowchart representing the fourth person verification process to be executed by a copier 10B.

Referring to FIGS. 9 and 10, the following describes the first variation of the third embodiment. This variation has the same configuration as that of the third embodiment, except that the fourth person verification process, instead of the third person verification process, is executed. The description of the same portion will be omitted to avoid duplication. In the present variation, the HDD 15B stores the fourth person verification program and third registered data group 300A.

FIG. 9 shows the configuration of the third registered data group 300A (a combined registered data group). The third registered data group 300A contains the ID 301, the referential data 302 corresponding to the ID 301, and a password 303 corresponding to the ID 301. Further, similarly to the first second registered data groups 310 and 320 in the third embodiment, the third registered data group 300A has registered data groups 310A and 320A.

Referring to FIG. 10, the following describes the fourth person verification process in order to explain the operation of the copier 10B as the present variation. FIG. 10 shows the flow of the fourth person verification process to be executed in the copier 10B. For example, immediately after the instruction to execute the fourth person verification process has been inputted through the operation section 12, the fourth person verification program is read out of the HDD 15B and is expanded on the RAM 13. Then the fourth person verification process is executed through collaboration between the CPU 11 and the fourth person verification program.

Steps S51 through S58 provide the same procedure as Steps S41 through S48, respectively. If there is no referential data corresponding to the ID (NO in Step S55), or no matching is found by the 1:1 verification (NO in Step S56), a message is indicated on the display section 14 to prompt the operator having inputted the fingerprint to input the password. The password corresponding to the operator ID is inputted by the operator through the operation section 12 (Step S59). The password 303 corresponding to the ID of the third registered data group 300A stored in the HDD 15B is read out. A decision step is taken to determine whether or not the password inputted in Step S59 matches the password having been read out (Step S60).

If the password matches (YES in Step S60), the system goes to Step S57. If the password fails to match (NO in Step S60), the system proceeds to Step S58.

As described above, the present variation allows the input of the password corresponding to the ID to be accepted, and determines the success or failure of the person verification, depending on whether the password is legitimate or not. Use of the password ensures adequate person verification even if the fingerprint feature data cannot be successfully obtained by the fingerprint input section 21.

[Variation 2]

Figure 11:
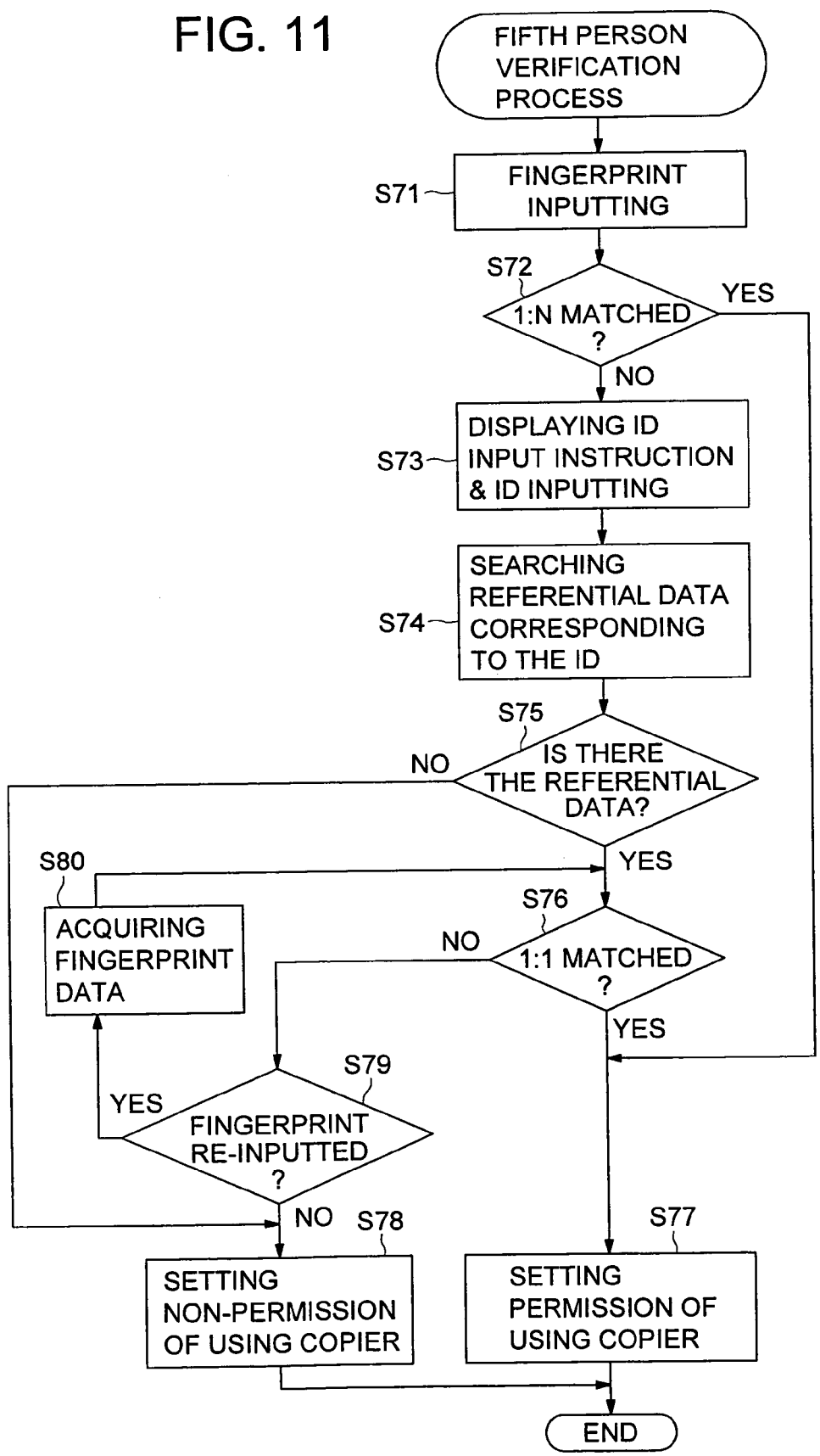
FIG. 11 is a flowchart representing the fifth person verification process to be executed by a copier 10B.
Figure 13:
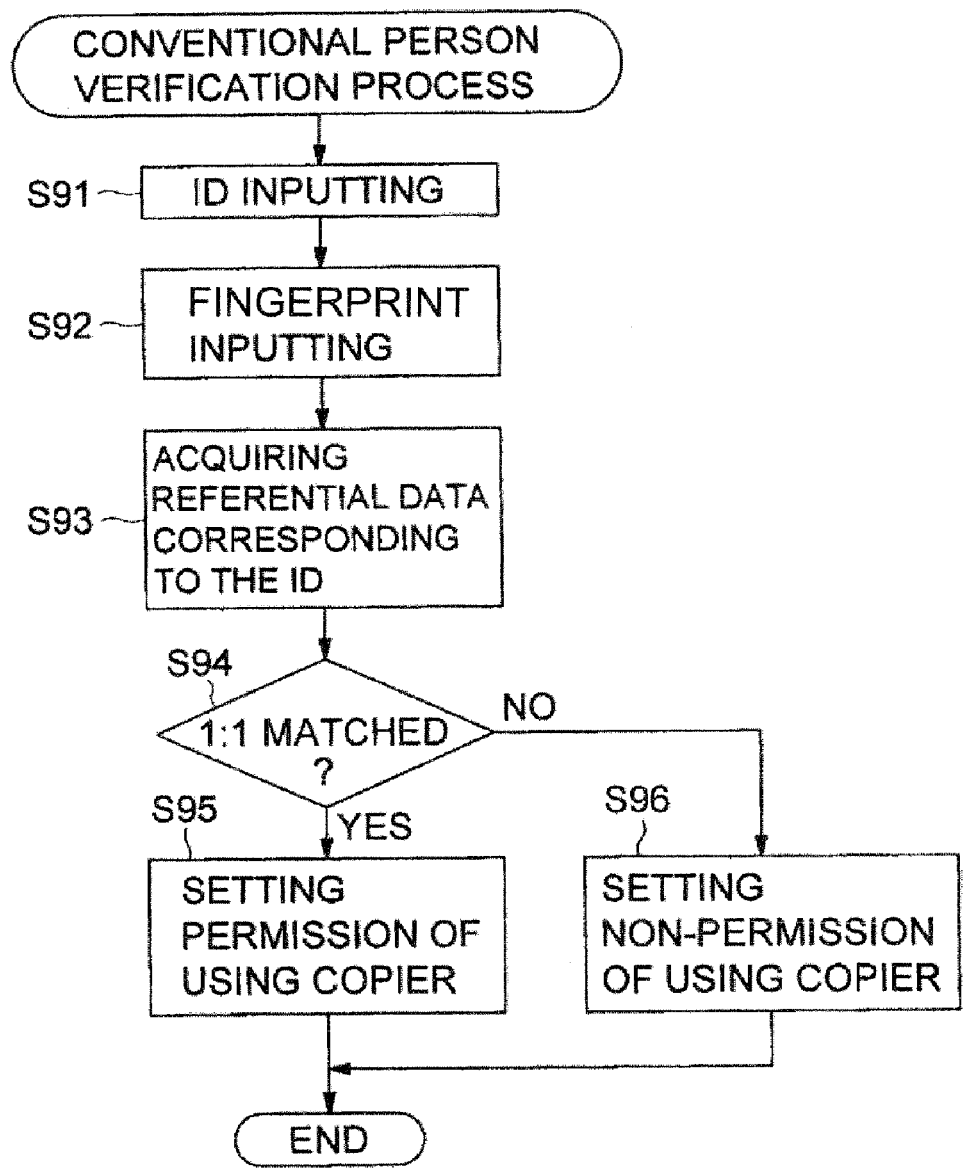
FIG. 13 is a flowchart showing the prior art person verification process.

Referring to FIG. 11, the following describes the second variation of the third embodiment. The present variation has the same configuration as that of the third embodiment, except that the fifth person verification process, instead of the third person verification process, is executed. The description of the same portion will be omitted to avoid duplication. In the present variation, the HDD 15B stores the fifth person verification program and registered data group 300.

Referring to FIG. 11, the following describes the fifth person verification process in order to explain the operation of the copier 10B as the present variation. FIG. 11 shows the flow of the fifth person verification process to be executed in the copier 10B. For example, immediately after the instruction to execute the fifth person verification process has been inputted through the operation section 12, the fifth person verification program is read out of the HDD 15B and is expanded on the RAM 13. Then the fifth person verification process is executed through collaboration between the CPU 11 and the fifth person verification program.

Steps S71 through S78 provide the same procedure as Steps S41 through S48, respectively. If no matching is found by the 1:1 verification (NO in Step S76), a message is indicated on the display section 14 to prompt the operator having inputted the fingerprint to input the fingerprint again. A decision step is taken (in Step S79) to determine whether or not the instruction has been inputted to prompt the fingerprint to be to inputted again through the operation section 12 by the operator having inputted the fingerprint in Step S71. If the fingerprint is not inputted again (NO in Step S79), the system goes to the Step S78.

If the instruction for the fingerprint to be inputted again is inputted (YES in Step S79), the fingerprint is inputted through the operation section 12 by the operator having inputted the fingerprint and the data of that fingerprint to be verified is generated and acquired (Step S80). Then the system goes to the Step S76. In the Step S76, comparison is made between the data of the fingerprint to be verified, inputted again and the referential data corresponding to the ID.

As described above, in the present variation, data of the fingerprint to be verified inputted again is acquired again, and the success or failure of the person verification is determined according to the comparison made between the acquired data to be verified and referential data corresponding to the ID. Thus, even if the data of the fingerprint to be verified inputted again cannot be adequately obtained, person verification is adequately performed using the data of the fingerprint to be verified inputted again.

It is also possible to arrange such a configuration that the aforementioned first and second variations are applied to the aforementioned first and second embodiments.

[Variation 3]

Figure 12:
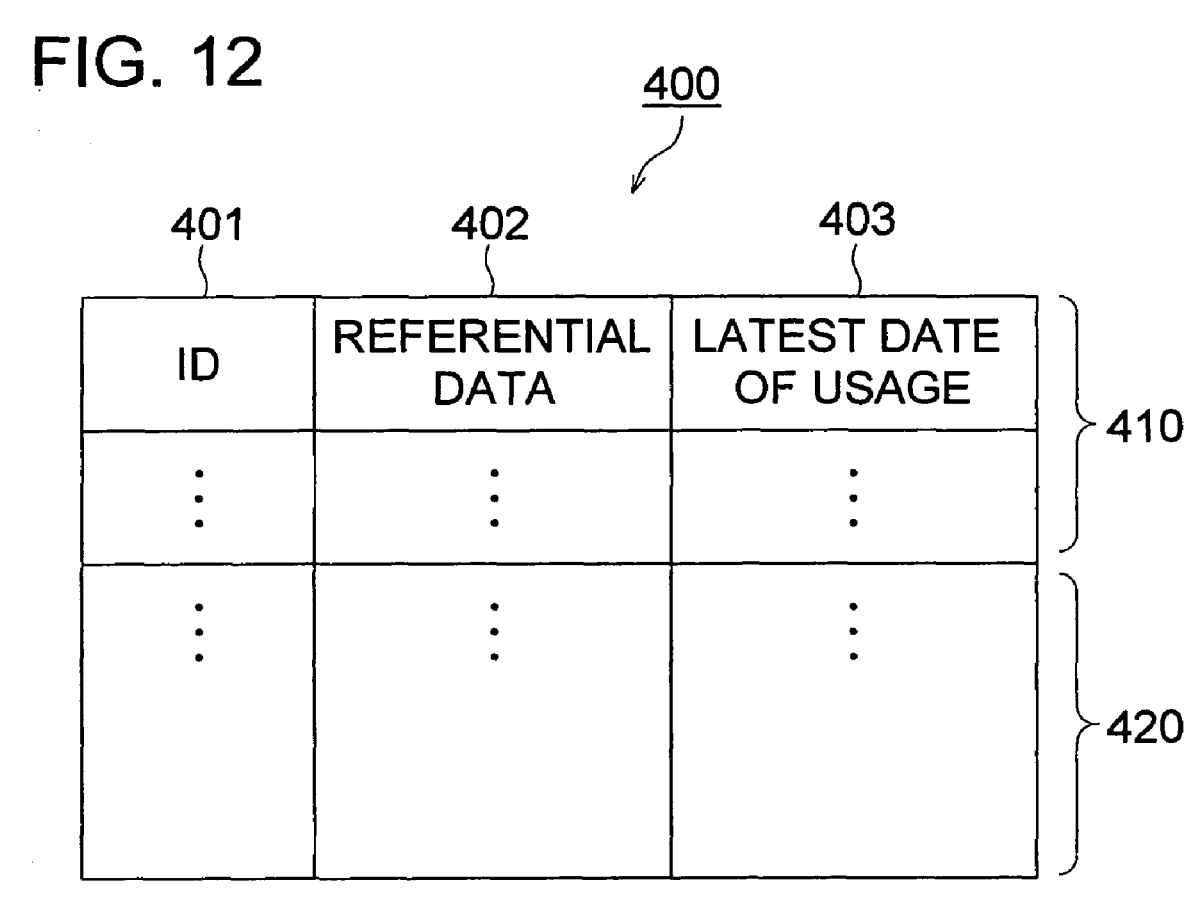

Referring to FIG. 12, the following describes the variation of the third embodiment. FIG. 12 shows the configuration of the fourth registered data group 400. In the third embodiment, the content used for the 1:N verification in the registered data group 300 is fixed. In the present variation, the record of the first registered data group 410 of the fourth registered data group 400 is updated on a periodic basis.

The fourth registered data group 400 (a combined registered data group) contains the ID 401 and the referential data corresponding to the ID 401, and the latest date and time of usage 403 wherein the copier 10B was used by the operator corresponding to ID 401. The fourth registered data group 400 also contains the first registered data group 410 used for 1:N verification, and the second registered data group 420 used for verification in the 1:1 verification. The first registered data group 410 has a predetermined number of records ranging from the highest position to the predetermined ordinal position as viewed in the order of records.

In the copier 10B, the latest date and time of usage 403 of the referential data 402 corresponding to the operator is updated optionally for each copier 10B used by each operator. In the copier 10B, the records of the fourth registered data group 400 are rearranged in reverse chronological order (chronological descending order), according to the latest date and time of usage 403 on a predetermined basis. In this arrangement, the first registered data group 410 is variable and is updated to new status.

As described above, in the copier 10B according to the present variation, the date and time wherein the copier 10B is used can be registered in the first registered data group 410 in order of the new person referential data, or the registered content can be updated. This arrangement increases the probability of matching of the referential data of the first registered data group 410 for 1:N verification, with the result that the person verification time is cut down.

It is also possible to make such arrangements that the present variation is applied to the first embodiment. In this case, for example, in the copier proper 10A, the fourth registered data group 400 is stored in the HDD 15, and is updated according to the history of usage by the operator. The first registered data group 410 is extracted on the periodic basis and the first registered data group 410 is sent to the fingerprint verification module 30 through the communication section 17. In the fingerprint verification module 30, the first registered data group 410 received through the communication section 34 is stored in the memory 35 for use in the 1:N verification.

Further, the present variation can be arranged in such a way as to be applied to the second embodiment. In the server 40 in this case, the fourth registered data group 400 is stored in the HDD 45 and the information on the history of usage by the operator is received from the copier 10B through the communication network N and communication section 46. Based on the information on the history of usage by the operator, the fourth registered data group 400 is updated. On the periodic basis the first registered data group 410 is extracted and is sent to the copier 10B through the communication section 46 and communication network N. In the copier 10B, the first registered data group 410 having been received through the communication section 22 is stored in the HDD 15B for use in the 1:N verification.

In the present variation, the first registered data group 410 is updated according to the date and time wherein the copier 10B is last used, but this variation is not to be considered limited thereof. For example, a predetermined number of persons can be the objects for the records in the first registered data group 410 according to the number of times the copier 10B is used, or in order of the persons using the copier frequently. Similarly, the present variation can be rearranged to be applicable to the first and second embodiments.

The description of the aforementioned embodiments and variations shows only a few of the preferable examples of the person verification apparatus, person verification system and person verification method according to the present invention, but the description is not to be considered limited thereof. The arrangement of the components of the person verification apparatus and person verification system, and the detailed operations thereof can be embodied in a great number of variations with appropriate modification or additions, without departing from the technological spirit and scope of the invention claimed. Further, at least two of the arrangements in the aforementioned embodiments and variations can be adequately combined.

Further, the aforementioned embodiments and variations have been described as having the arrangement wherein one and the same person, and one item of feature data are registered. Without the prevent invention being restricted thereto, a plurality of pieces of referential data for one and the same person (one and the same ID) can be recorded, for example. It is also possible to make such arrangements that comparison is made in the 1:N verification between the data of the fingerprint to be verified, and the N persons by a plurality of pieces of referential data. Comparison is made between in the 1:1 verification between the inputted data of the fingerprint to be verified and a plurality of piece of referential data corresponding to the ID. In this case, comparison can be made with the referential data most similar to the inputted feature data, out of a plurality of pieces of referential data, for example. Further, a plurality of pieces of referential data for one and the same person can be composed of the feature data of a plurality of fingers. Use of such a plurality of pieces of referential data for one and the same person provides greater variety in person verification.

In the description of the aforementioned embodiments and variations, the information on fingerprint is used as biological information for person verification. Without being restricted thereto, it is also possible to make such arrangements that at least one of the fingerprint, iris, face, vein and voice print, for example, is used. Such an arrangement of using biological information enhances the security in person verification.

The present invention avoids the need of frequent ID input operations, and enhances the convenience. Further, person verification is provided by comparison made between feature data. This arrangement enhances the security in person verification.

What is claimed is:

1. A person verification apparatus comprising:
   a biological information input section to receive an input of biological information of a person and to obtain data of the biological information as data to be verified;
   an ID input section to receive an input of an ID of a person;
   a first memory section to store a first registered data group containing a first plurality of pieces of biological referential data;
   a second memory section to store a second registered data group containing a second plurality of pieces of biological referential data and IDs which respectively correspond to the second plurality of pieces of biological referential data; and
   a control section which (i) compares the data to be verified with the first plurality of pieces of biological referential data by a 1 to N verification method in which the piece of data to be verified is compared with the first plurality of pieces of biological referential data, without using the ID to be received by the input section, and (ii) if the data to be verified does not match with any of the first plurality of pieces of biological referential data, obtains biological referential data from the second registered data group corresponding to the ID received by the ID input section and compares whether the obtained biological referential data corresponding to the ID matches with the data to be verified;
   wherein the first registered data group contains biological referential data corresponding to fewer persons than the second registered data group;
   wherein the first registered data group and the second registered data group are provided together in a combined registered data group containing latest dates and times of usage corresponding respectively to the pieces of biological referential data; and
   wherein the first registered data group is updated to comprise a predetermined number of the pieces of biological referential data having the most recent latest dates and times of usage in the combined registered data group.

2. The person verification apparatus of claim 1, wherein the first registered data group contains IDs which respectively correspond to the first plurality of pieces of biological referential data.

3. The person verification apparatus of claim 2, wherein each of the IDs is correlated with individual setup information; and wherein, if the control section has determined that the data to be verified matches with one of the pieces of biological referential data in the first registered data group or with one of the pieces of biological referential data in the second registered data group, the control section obtains the individual setup information correlated with the ID corresponding to the biological referential data that has been determined to match with the data to be verified.

4. The person verification apparatus of claim 1, wherein when comparing the data to be verified with the pieces of biological referential data in either of the first or second registered data groups, the control section determines whether a rate of agreement between the data to be verified and one of the pieces of biological referential data is not less than a predetermined threshold value.

5. The person verification apparatus of claim 4, wherein the control section sets a permission to use a prescribed apparatus if the control section has determined that the rate of agreement between the data to be verified and one of the pieces of biological referential data in either of the first or second registered data groups is not less than the predetermined threshold value.

6. The person verification apparatus of claim 4, wherein the control section sets a permission to use an image forming apparatus for forming an image on a recording medium, if the control section has determined that the rate of agreement between the data to be verified and one of the pieces of biological referential data in either of the first or second registered data groups is not less than the predetermined threshold value.

7. The person verification apparatus of claim 1, wherein if the control section determines that the obtained biological referential data corresponding to the ID received by the ID input section does not match with the data to be verified, the control section obtains another data to be verified through reentry of biological information at the biological information input section, and compares whether the obtained another data to be verified matches with the obtained biological referential data corresponding to the ID received by the ID input section.

8. The person verification apparatus of claim 1, wherein the combined registered data group contains a password corresponding to each of the IDs;

wherein the control section obtains a password through the ID input section, if the obtained biological referential data from the second registered data group corresponding to the ID received by the ID input section does not match with the data to be verified; and wherein the control section obtains a password from the combined registered data group corresponding to the ID received by the ID input section, and compares whether the password obtained through the ID input section matches with the password obtained from the combined registered data group.

9. The person verification apparatus of claim 1, wherein the first memory section and the second memory section are provided in different memory devices.

10. The person verification apparatus of claim 1, wherein the first memory section and the second memory section are provided in a same memory device.

11. The person verification apparatus of claim 10, wherein the first registered data group and the second registered data group are structured in a unitary database.

12. The person verification apparatus of claim 1, wherein plural pieces of biological referential data are registered corresponding to a same ID.

13. The person verification apparatus of claim 1, wherein the biological information is information of at least one of fingerprint, iris, face, vein, and voiceprint.

14. The person verification apparatus of claim 1, wherein the first registered data group is additionally stored independently of the fourth registered data group.

* * * * *